T. G. KNIGHT.
Stench Trap.
No. 202,176. Patented April 9, 1878.
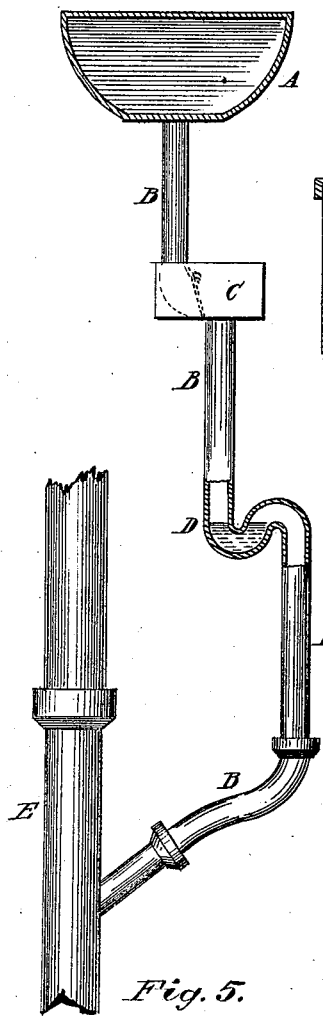
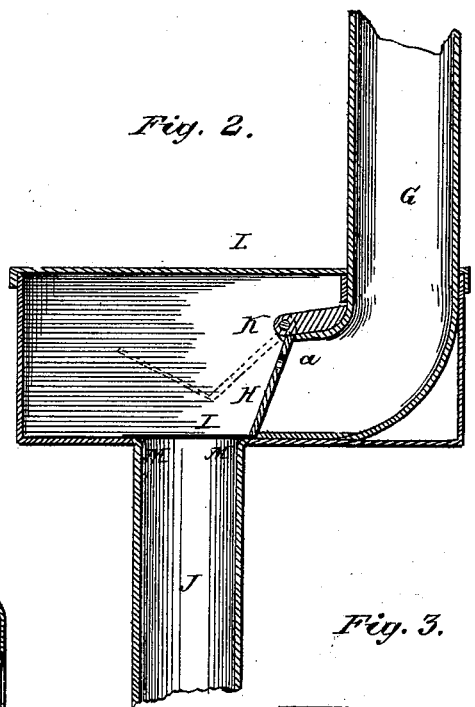
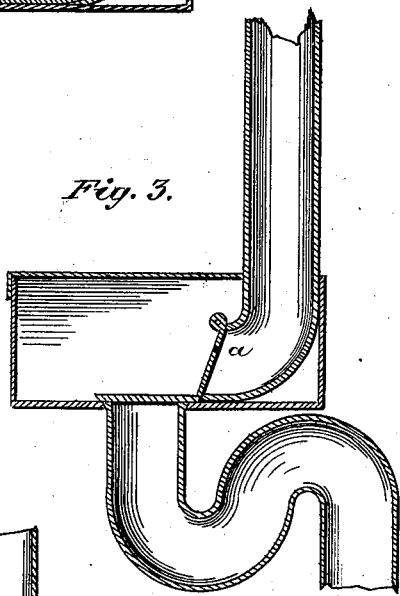
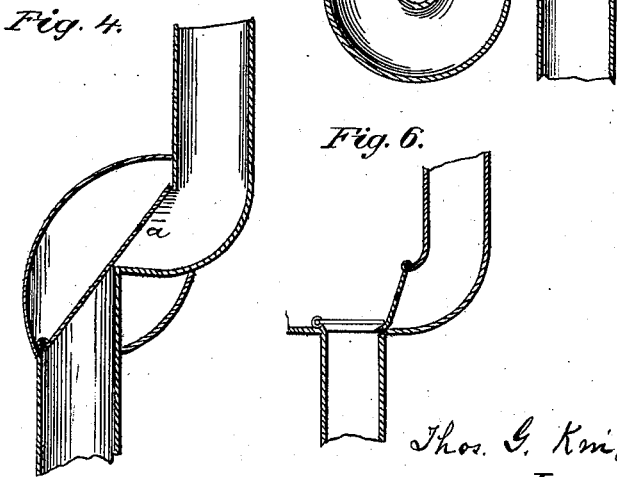
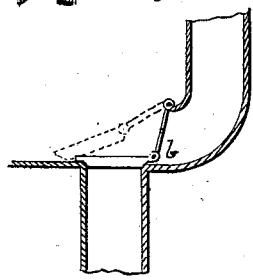
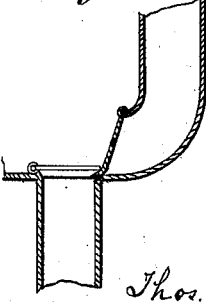
Witnesses
Fred G. Dietrich
J. Vance Lewis
Thos. G. Knight
Inventor
by Geo. A. Sawyer,
Attorney.
N. PETERS, PHOTO-LITHOGRAPHER, WASHINGTON, D. C.

UNITED STATES PATENT OFFICE.

THOMAS G. KNIGHT, OF BROOKLYN, NEW YORK.

IMPROVEMENT IN STENCH-TRAPS.

Specification forming part of Letters Patent No. 202,176, dated April 9, 1878; application filed March 21, 1878.

*To all whom it may concern:*

Be it known that I, THOMAS G. KNIGHT, of Brooklyn, in the county of Kings and State of New York, have invented certain new and useful Improvements in Stench-Traps; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Various devices have been used in efforts to overcome the liability of siphonage in stench-traps.

My invention furnishes a complete and efficient remedy for the evil; and consists in cutting off the atmospheric pressure from above the water-seal of a trap by means of the valves, hereinafter described, placed at the inlet of the trap, or at some point in the waste-pipe between the trap and the wash-basin or other receptacle above, said valve being so arranged that, while it readily yields to the pressure of a body of descending water, it is only closed more tightly by the pressure of the atmosphere, thereby preventing the air from passing down through the waste-pipe, thus relieving the water-seal from atmospheric pressure when a partial vacuum is created in the waste-pipe below the trap through suction.

In the drawing, Figure 1 shows a sectional view of a wash-basin, waste-pipe, and trap having my improvement. Fig. 2 shows a sectional view of the automatic valve attachment. Fig. 3 shows the valve attachment combined with the inlet of the trap. Fig. 4 shows a second modification of the valve, pivoted below. Fig. 5 shows another form of the valve, made of two parts, pivoted above, but connected by a hinged joint, *b*. Fig. 6 shows still another form, the two parts of the valve having each its own pivot, the lower end of the upper part fitted under the edge of the lower part, so that any movement of the upper part necessarily raises the lower part and permits the fluid to pass down.

In Fig. 1, A represents a basin-sink, water-closet, or other receptacle; B, the waste-pipe, through which the waste-water from the basin passes; C, the automatic valve attachment; D, the stench-trap; E, the main drain-pipe.

In Fig. 2, G is the inlet to valve attachment. H is the lever-valve, which is moved forward from its seat by the weight of the water passing in and down through inlet G. I is a valve which closes outlet-pipe J, so that air passing in and down through inlet G can get no farther than valve I, no matter how great the suction below this valve. The valves H, closing the inlet-pipe, and I, closing the outlet-pipe, are in one or two pieces, and may both move upon the hinge of the upper valve; or they may have a hinge connecting them, or each may be hinged separately. In Fig. 4 the orifices of inlet and outlet pipes are brought together, and the single valve covers both.

When the valve is made double, as in Fig. 3, the mouth of the outlet-pipe may be beveled, and the valve beveled to correspond, to insure a close fit. A small hole may be drilled through the upper valve, as at *a;* or this valve may not be fitted tightly in manufacturing, so as to permit the free passage of air to the top of the lower valve, and thereby keep it closed.

The operation of this device is as follows: Water passing down the waste-pipe into inlet G opens the valve H, which, of course, carries valve I with it, and permits the water to pass on downward into the trap below. As soon as the water has passed, the valves close; and, if at any time a vacuum is created below this point, the pressure of air on top of the valve I tends to keep it closed, and prevent the admission of the air upon the top of the water-seal, whereby it would be siphoned, and the sewer-gas thereby permitted to enter the house.

This valve attachment is susceptible of various modifications as to size and shape, and may be made of any suitable material. It may also be placed at any point in the waste-pipe between the basin and the trap, or may be attached directly to the inlet-pipe of a trap, as in Fig. 3; or, if placed in waste-pipes of dwellings where there are already stench-traps, and where but little room or space has been left between the stench-traps and the wash-basins or other receptacle, the valve attachment may be connected directly with the outlet of said wash-basin or other receptacle.

Having thus described my invention, what

I claim as new, and desire to secure by Letters Patent, is—

1. An automatic stench-trap valve having the part H covering the inlet-pipe and the part I closing the outlet, permitting the downward passage of water, but cutting off the downward passage of air, thereby preventing the siphonage of the water-seal below, substantially as described.

2. An automatic stench-trap valve, the part H covering the inlet, and the part I covering the outlet, the said parts H and I connected by the hinged joint $a$, substantially as described.

3. An automatic stench-trap valve, the part H covering the inlet, and the part I covering the outlet, the two parts pivoted on opposite sides, and the lower part of the upper flap H projecting under the free edge of the flap I, whereby any movement of the upper flap raises the lower flap and permits the passage of fluid, substantially as described.

In testimony that I claim the foregoing as my own I affix my signature in presence of two witnesses.

THOMAS G. KNIGHT.

Witnesses:
ANDREW RYAN,
JOHN A. MURRAY.